Figure 1:
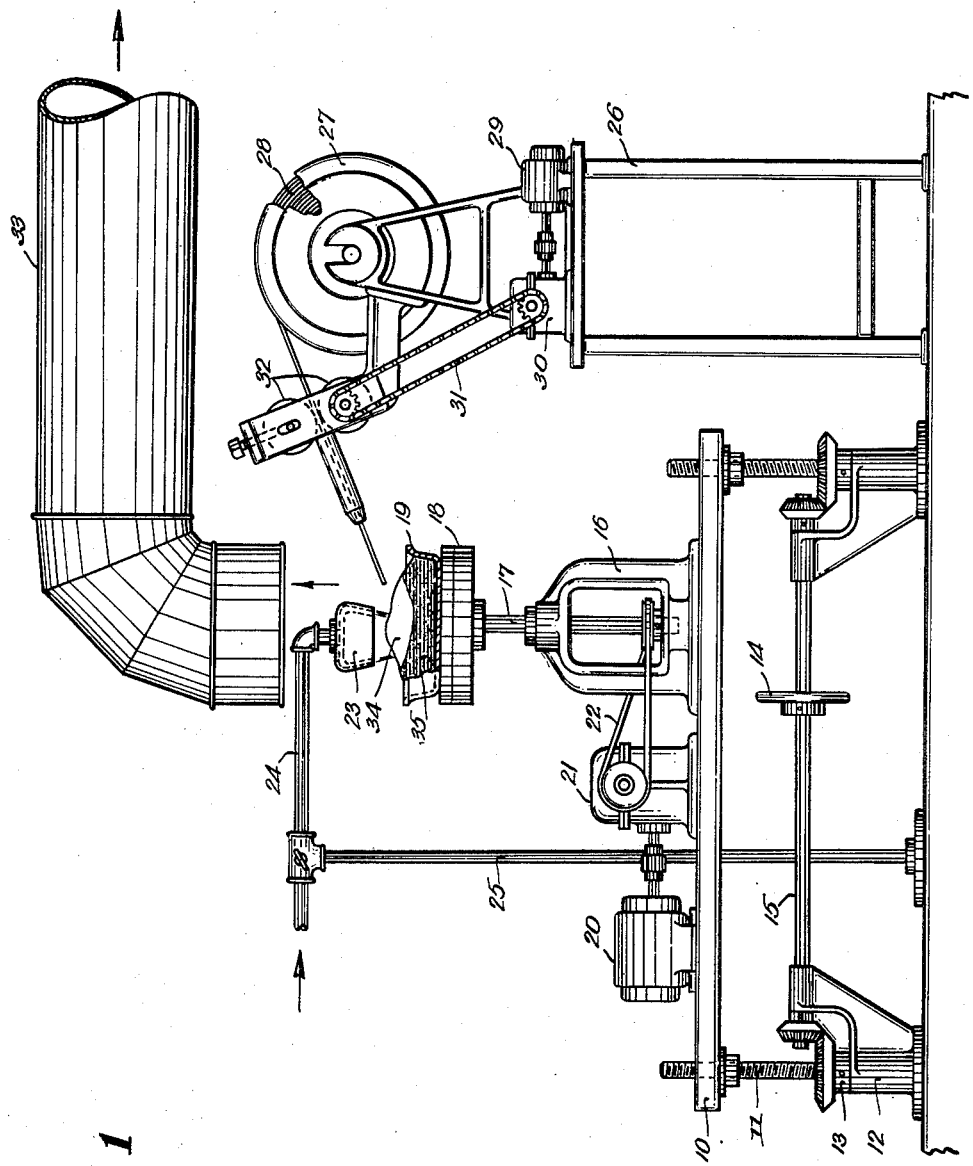

April 8, 1958 C. B. WENDELL, JR., ET AL 2,829,949
APPARATUS FOR MAKING ALUMINUM OXIDE
Filed Sept. 20, 1952 3 Sheets-Sheet 2

INVENTOR.
Charles B. Wendell Jr. & George E. Engelson
BY
Kenway Jenney, Witter & Hildreth
Attys.

April 8, 1958  C. B. WENDELL, JR., ET AL  2,829,949
APPARATUS FOR MAKING ALUMINUM OXIDE
Filed Sept. 20, 1952  3 Sheets-Sheet 3

INVENTOR.
Charles B. Wendell jr. & George E. Engelson
BY
Hemenway, Jenney, Witter & Hildreth
Attys.

United States Patent Office 2,829,949
Patented Apr. 8, 1958

2,829,949

APPARATUS FOR MAKING ALUMINUM OXIDE

Charles B. Wendell, Jr., Needham, and George E. Engelson, Nantasket, Mass., assignors to Godfrey L. Cabot, Inc., Boston, Mass., a corporation of Massachusetts Application September 20, 1952, Serial No. 310,604

3 Claims. (Cl. 23—142)

This invention relates to processes and apparatus for the production from metallic aluminum of finely divided aluminum oxide having characteristics that render it particularly useful in compounding rubber. This application is a continuation-in-part of our copending application Ser. No. 158,856, filed April 28, 1950, now United States Patent No. 2,693,406, November 2, 1954, wherein is claimed the new and improved process herein disclosed.

Finely divided aluminum oxide pigments are finding increasing industrial utility, for example, as reinforcing agents in rubber, as fillers in protective coatings, as abrasives and as the basic ingredient of synthetic jewels. So far as we are aware all such pigments are produced commercially at the present time by the oxidation or hydrolysis of purified aluminum salts. Such processes are expensive to operate.

Aluminum oxide pigments (about minus 200 mesh in particle size) may also be produced by burning powdered aluminum in oxygen. Such process is exceedingly dangerous to operate since slight distortion from reaction equilibrium will usually result in a violent explosion and consequent total destruction of apparatus in which carried on. Furthermore, the storage of powdered aluminum presents a considerable hazard as in this form aluminum is subject to spontaneous combustion. Consequently, the process described is not carried out on a commercial basis.

Various attempts have been made to produce aluminum oxide by oxidation of metallic aluminum but none of these attempts has been successful heretofore because aluminum when exposed to the atmosphere becomes covered immediately by a protective oxide film. This film rapidly forms on freshly exposed aluminum surfaces. Although it is of slight thickness, it is impervious in its effect. On heating the film increases in thickness and remains protective even at the melting point of the metal.

We have discovered that when a pool of molten aluminum is heated to above the point at which its oxide skin will be disrupted and has concentrated upon the surface thereof a stream of oxygen-rich gas the metal will burn. One suitable method of igniting the aluminum is to concentrate upon a small and critical amount of the aluminum an exceedingly hot flame in which is present an excess of oxygen over that required for burning the combustible constituent of the flame. When the metal has reached the temperature at which the oxide skin is disrupted and the raw metal is exposed to the flame and oxygen the molten aluminum itself will burst into flame. Thereafter the molten aluminum may be burned in a stream of oxygen-rich gas. Once the burning has commenced it will continue so long as fresh aluminum continues to be fed into the molten mass and the proper ratio of oxygen flow to aluminum feed is maintained.

Heretofore, it has been considered manifestly impossible to produce aluminum oxide from metallic aluminum which is not in powdered form. The Encyclopedia of Chemical Technology, published by the Interscience Encyclopedia, Inc., vol. 1, page 592, states that when molten aluminum is subjected to heating it forms a film of aluminum oxide which is so protective that burning will not occur.

It is an object of our invention to provide a simple and inexpensive process for the production of aluminum oxide powder directly from molten aluminum.

It is a further object of our invention to provide a process whereby metallic aluminum may be converted to aluminum oxide without first subdividing the metal to a powder.

It is a further object of our invention to provide novel apparatus in which the process of our invention may advantageously be carried out.

We have discovered that an excellent finely divided aluminum oxide powder of characteristics heretofore unknown can be produced by burning molten aluminum. Our novel process is characterized by the steps of heating the molten aluminum to above the temperature at which the oxide skin normally thereon is disrupted and directing a stream or a plurality of streams of oxygen-rich gas into the burning aluminum and continuously feeding fresh aluminum to the combustion zone. While burning continues a white smoke is given off which is the aluminum oxide product and which is drawn into a flue by any convenient means and conducted to suitable recovery apparatus such as a bag filter. The reaction continues without the addition of external heat so long as fresh metal and oxygen-rich gas are fed to the reaction zone provided the rate of metal addition is not so rapid as to cause the temperature of the molten aluminum mass to drop below the disruption point of the oxide skin to allow the skin to reform and smother the flame.

Any convenient method of concentrating a hot flame and oxygen may be employed for igniting the molten aluminum. One such method is to ignite a charge of aluminum powder in a stream of oxygen-rich gas directed upon the pool and feed solid metal powder to the flame while continuing the gas flow. The molten metal of the pool is continuously burned according to the process of our invention.

A novel method of igniting the aluminum initially, which constitutes a feature of this invention, is to direct a high temperature flame rich in oxygen, such as from an oxyacetylene torch adjusted to deliver an excess of oxygen over the amount necessary to burn all of the acetylene supplied, onto a small charge of the molten metal. With the full intensity of the flame concentrated upon the small target of molten aluminum metal the oxide skin is attacked externally by the flame and internally by the pressure exerted by the expanding metal and vapors as the boiling point is approached. These effects occur in rapid sequence and cause the protective skin of aluminum metal to break open and peel to the periphery of the molten mass, thereby exposing the metal, which immediately ignites and burns. Once the aluminum metal commences to burn a stream of oxygen or gas rich in oxygen is directed into the burning mass of molten aluminum at which point the acetylene flame is removed.

Although the limiting conditions in respect to the size of the starting charge, the intensity of the heat required to initiate the burning reaction by igniting the molten aluminum and the time required to initiate the reaction are as yet not fully determined, we have found that it is only essential that the heat applied be sufficient to increase the temperature of the molten aluminum sufficiently to cause the surface film of oxide to break open and expose the raw metal to the oxygen stream. Accordingly, a small starting charge facilitates rapid initiation of the burning reaction, since loss of temperature due to radiation, conduction and convection is increased in proportion to the size of the starting charge used. We have found, for example, that with a single oxyacetylene hand torch a pool of aluminum about one-half inch in diameter is convenient. With that, the heat of an oxyacetylene flame rich in oxygen will initiate the reaction within a period of less than five minutes.

The energy of the burning reaction is sufficient to occasion a white light of high intensity to be emitted from the reaction zone. From observing this white light through an optical pyrometer, we have determined the temperature of the reaction to be in excess of 5500° F.

The product obtained in this manner is unique, that is, different in particle size and shape from aluminum oxide produced by hydrolysis or by oxidation of aluminum salts. The particles produced by the practice of our invention are uniformly spherical, have a neutral pH and are larger and are easier processed in rubber than are the aluminum oxides heretofore available.

As a secondary or by-product in our process, an extremely hard slag is formed in the container as the aluminum is burned. Apparently some of the alumina particles are thrown to the sides of the molten body and freeze with other alumina particles there and/or with some of the molten aluminum of the reaction. This material freezes out along the sides of the container and on the bottom of the container and builds up like a volcano so that eventually the pool of molten aluminum is contained in a crater of very hard refractory material. This slag has valuable refractory and abrasive properties.

These and other features and characteristics of our invention will be best understood and appreciated from the following description of a preferred manner of carrying out our novel process, in connection with the accompanying drawings which illustrate diagrammatically one form of apparatus satisfactory for carrying out the process of our invention.

Figure 2:
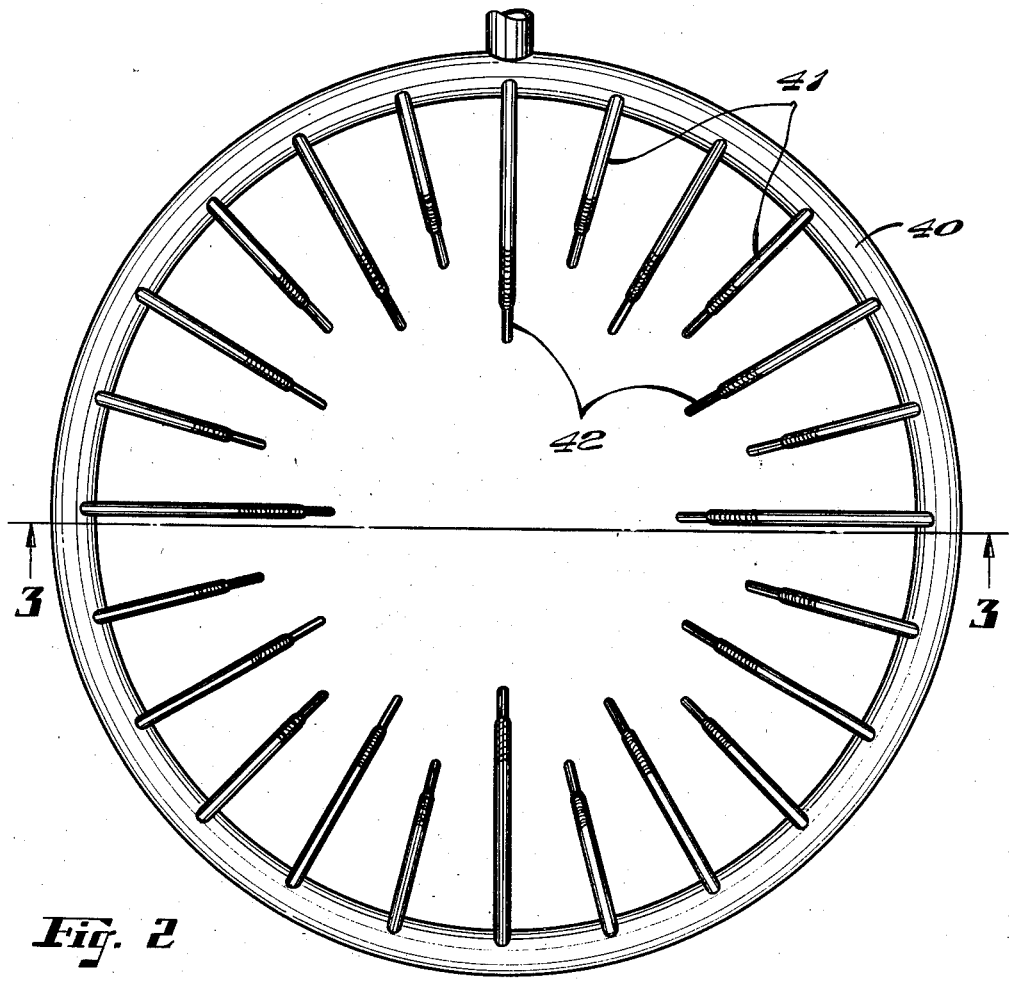
Figure 3:
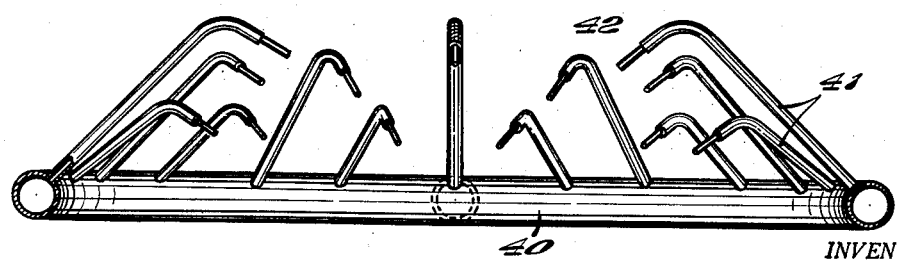
Figure 4:
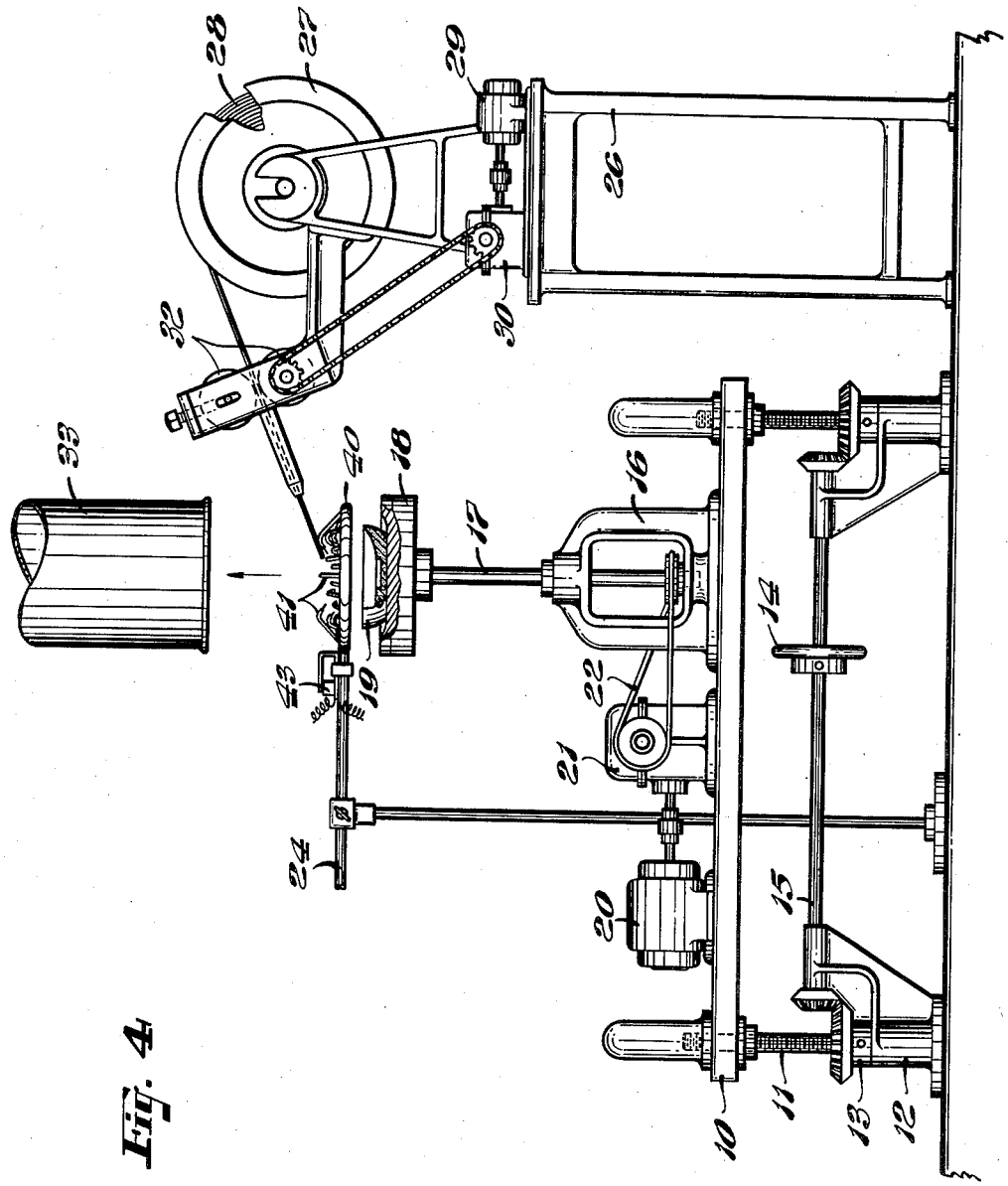

In the drawings:

Fig. 1 is a view in side elevation of the apparatus of our invention provided with one suitable type of oxygen-rich gas injector, Fig. 2 is a plan view of another type of oxygen-rich gas injector shown on a larger scale than that of Fig. 1, Fig. 3 is a side view, partly in section on the line 3—3 of Fig. 2, and Fig. 4 is a view of the apparatus shown in Fig. 1 equipped with the gas injector of Figs. 2 and 3.

The illustrated apparatus comprises a table 10, adjustably mounted on supporting screws 11, projecting upwardly from standards 12. Each standard supports a threaded nut 13, and these may be rotated simultaneously to adjust the height of the table my means of a hand wheel 14 fast to a horizontal rod 15 operating the nuts 13 through beveled gear connections.

The table 10 supports an upright frame 16 in which is journaled a spindle 17 carrying at its upper end a disk 18. Upon the disk is supported a crucible 19 of graphite or other refractory material. The table 10 also supports a motor 20 acting through a reducing gear 21 and an endless belt 22 to rotate the spindle 17 and the crucible at a slow rate, for example, about 10 to 50 R. P. M. An oxygen distributing head or nozzle 23 is carried by a pipe 24 supported on a standard 25 and has connections, not shown, by which either oxygen alone or a mixture of oxygen and air may be supplied to the head 23. An adjacent stand 26 is provided upon which is mounted a reel 27 containing a coil of aluminum wire 28. The stand 26 also carries a motor 29 acting through a reducing gear 30 and a sprocket chain 31 to operate feed rollers 32 for advancing the aluminum wire to the crucible 19. The crucible itself is located directly beneath the inlet end of a hood or duct 33 by which the gaseous products of combustion are collected and brought to a bag filter or other separating device. The crucible 19 is represented as containing a crater of hard slag 35 and a pool 34 of molten aluminum.

Another type of oxygen-rich gas injector is shown in detail in Figs. 2 and 3. It is organized to distribute oxygen uniformly over the surface of the burning aluminum and has high capacity to provide high production rates for the aluminum oxide product of this invention.

The injector consists of a horizontally disposed annular manifold 40 from which project upwardly and inwardly a plurality of tubes 41 curved at their outer ends to direct their jets radially inwards and downwardly. Each tube may be equipped with ceramic tips 42 as shown or may be constructed of alloy or laminated metals capable of withstanding the exceedingly high reaction temperatures of the process. The direction and curvature of tubes 41 are variable over a considerable range. It is merely necessary that they be arranged in such manner that the gas flow will be downwardly and inwardly upon the burning aluminum.

It will be noted that the gas tubes 41 are illustrated as being arranged in tiers or banks, one tier of long tubes and the other of short tubes. Such arrangement, which may include more than two banks of tubes, is preferred for providing even distribution of oxygen over the surface of the aluminum pool. Thus, the gas from the long tubes will tend to reach the center of the pool while that from the short tubes will supply the periphery of the pool and serve as trimmers to prevent the loss of molten metal over the sides of the container.

We have found that for optimum performance a certain critical angular relationship between the opposing jets and the surface of the melt should be maintained. Thus, each tube should be positioned diametrically opposite a tube of the same height and the jets should be directed in the plane common to their axes and being located in a group at such a height as uniformly to cover the surface of the aluminum pool.

During the reaction tubes 41 and tips 42 tend to have deposited thereon a portion of the aluminum oxide product. This deposit may tend to distort the gas flow from the jets and hence a vibrator 43 may advantageously be secured to supporting gas pipe 24 and intermittently operated.

From the foregoing description, it will be understood that a small pool of molten aluminum is first formed in the crucible 19 and this may be accomplished by directing a flame rich in oxygen upon the end of the aluminum rod or wire 28 or in any other convenient manner. When following the preferred method of igniting the aluminum in accordance with our invention the small pool of aluminum is subjected to the flame until the molten aluminum ignites and this occurs when the pure metal is exposed to the flame due to the melting of the oxide coating and at the same time the raising of the vapor pressure of the molten aluminum to such an extent that it will break through the oxide coating. The high heat capacity of the aluminum and its heat conductivity make it necessary to use a small amount of metal in starting the reaction. The use of more metal would necessitate the use of an excessive amount of oxygen and acetylene which, in turn, would create enough gas velocity to blow the metal away from the ignition point. Once a small pool of aluminum has begun to burn, its size may be increased to any desired mass by carefully feeding fresh metallic aluminum at a rate at which the heat removed by the fed metal in melting and vaporizing does not exceed the heat required for maintaining the burning reaction.

The folowing data taken from typical runs are illustrative of the process of our invention.

| Run No. | 1 | 2 | 3 | 4 |
| --- | --- | --- | --- | --- |
| Metal (grams) | 112 | 97 | 96 | 93 |
| Metal Feed rate (grams/min.) | 7.1 | 6.1 | 6.0 | 6.8 |
| Oxygen flow (cu. ft./min.) | 0.15 | 0.15 | 0.15 | 0.23 |
| Air flow (cu. ft./min.) | 0.12 | 0.1 | 0.08 | None |
| Time of run (min.) | 15 | 15 | 15 | 13 |
| Dross or slag (grams) | 31 | 32 | 34 | 30 |
| Product (grams) | 151 | 124 | 136 | 133 |
| Collected Yield (percent of theoretical) [1] | 71 | 68 | 75 | 76 |

[1] Calculated from the equation $2Al + 1\tfrac{1}{2}O_2 \rightarrow Al_2O_3$.

The percentage of theoretical yield which is collected will vary in accordance with the efficiency of the collection equipment used. While our collection efficiency has heretofore varied between 65 and 75%, we contemplate more favorable recoveries with more elaborate recovery equipment.

The aluminum oxide produced by our novel process possesses unique characteristics. The individual particles are perfectly spherical in shape as compared to the roughly round particles of hydrolysis-formed oxide. In size they may vary from 50 to 8000 Angstrom units in diameter. An electron micrograph shows that the particles of the same general size tend to clump together. Other analytical properties include:

| | |
|---|---|
| pH (determined in water suspension) | 6.3. |
| Moisture at 105° C | 0.64%. |
| Ignition loss at 1750° F | 0.2%. |
| Surface area | 12–32 m.²/gm. |
| Apparent density | Approximately 50 lb./cu. ft. |

It has been noted that aluminum oxides heretofore available can be compounded with rubber only with considerable difficulty, whereas the oxide produced by our novel process may be easily incorporated and fully dispersed in natural or synthetic rubber and resins. When compounded with rubber stock, it has the effect of producing a soft, resilient white stock of good tensile strength.

It will be readily apparent to one skilled in the art that the aluminum which is used as the raw material may be added in other forms than the wire, as described above. For example, aluminum rod, scrap aluminum or molten aluminum, etc., may be added with equally effective results, provided that contaminants are prevented from mingling with the product.

Having thus disclosed our invention and described a preferred method of carrying it out, we claim as new and desire to secure by Letters Patent:

1. Apparatus for producing aluminum oxide from the combustion of molten aluminum, comprising a heat-resistant container rotatable about a vertical axis, means for feeding aluminum wire to the container, and oxygen nozzles arranged radially about the periphery of the container in two banks, one bank being directed toward the center of the molten pool in the container, and the other bank being directed toward the periphery of the pool, its nozzles serving as trimmers to prevent loss of molten metal over the sides of the container.

2. Apparatus as described in claim 1 in which each nozzle is located diametrically opposite a nozzle of the same height above the container.

3. Apparatus as described in claim 1 in which a vibrator is located in operative relation to all of the oxygen nozzles.

References Cited in the file of this patent

UNITED STATES PATENTS

| | | |
|---|---|---|
| 382,196 | Seymour | May 1, 1888 |
| 683,089 | Wideen | Sept. 24, 1901 |
| 721,092 | Rendell | Feb. 17, 1903 |
| 740,364 | Keagh | Sept. 29, 1903 |
| 1,168,061 | Deppeller | Jan. 11, 1916 |
| 1,871,793 | Horsfield | Aug. 16, 1932 |
| 1,968,933 | Feldman | Aug. 7, 1934 |
| 1,976,875 | Connolly | Oct. 16, 1934 |
| 2,006,891 | Hegmann | July 2, 1935 |
| 2,008,188 | Ripner | July 16, 1935 |
| 2,012,092 | Anderson | Aug. 20, 1935 |
| 2,224,501 | Cooper | Dec. 10, 1940 |
| 2,253,364 | Cohen | Aug. 19, 1941 |
| 2,261,639 | Benner et al. | Nov. 4, 1941 |
| 2,365,346 | Kruh | Dec. 19, 1944 |
| 2,506,598 | Johnson | May 10, 1950 |
| 2,531,964 | Bean | Nov. 28, 1950 |
| 2,577,837 | Bifferer | Dec. 11, 1951 |
| 2,672,404 | Schultz | Mar. 16, 1954 |
| 2,683,079 | Booth | July 6, 1954 |
| 2,693,406 | Wendell | Nov. 2, 1954 |

OTHER REFERENCES

Baker et al.: "An Oxy-Aluminum Blowtorch," Industrial and Engineering Chemistry, vol. 22, No. 7, pages 788–789.

Mellor: "Comprehensive Treatise on Inorganic Chemistry," page 203, page 204, vol. 5, Longmans Green Co., New York, N. Y., 1924.

Hodgman: "Handbook of Chemistry and Physics," pages 338, 339, Chemical Rubber Publishing Co., 27th edition, 1943.

Kent: "Mechanical Engineer's Handbook," pages 13–10, Wiley, New York. 11th ed.

Smith Kendall: "Inorganic Chemistry," Appleton Century Co., 1937, New York, N. Y., page 770.